United States Patent
Rauscher

[11] 4,034,616
[45] July 12, 1977

[54] PULLEY MEANS

[76] Inventor: David A. Rauscher, 705 Formby Drive, Columbia, S.C. 29204

[21] Appl. No.: 623,006

[22] Filed: Oct. 16, 1975

[51] Int. Cl.² .................. F16H 55/36; F16H 55/48
[52] U.S. Cl. .......................................... 74/230.05
[58] Field of Search ....... 74/230.05, 230.3, 230.01, 74/230.5; 254/190 A; 29/159 R, 148.5 R, 149.5 NM, 230.3, 230.4, 230.7

[56] References Cited

U.S. PATENT DOCUMENTS

| 24,097 | 5/1859 | Calhoun | 254/190 A |
|---|---|---|---|
| 1,952,940 | 3/1934 | Rabelos | 254/190 A |
| 2,218,854 | 10/1940 | Rabelos | 254/190 A |
| 2,665,114 | 1/1954 | Michalski | 254/190 A |
| 2,760,378 | 8/1956 | Deventer | 74/230.01 |
| 2,889,053 | 6/1959 | Angelico | 254/190 A |
| 3,006,382 | 10/1961 | Broome | 74/230.01 |
| 3,006,382 | 10/1961 | Broome | 74/230.01 |
| 3,010,626 | 11/1961 | Crockett, Jr. | 74/230.01 |
| 3,651,704 | 3/1972 | Chapman et al. | 74/230.01 |
| 3,694,958 | 10/1972 | Parker et al. | 29/149.5 NM |
| 3,785,217 | 1/1974 | Peura | 74/230.3 |

Primary Examiner—Samuel Scott
Assistant Examiner—Allan B. Burke
Attorney, Agent, or Firm—Mason, Fenwick & Lawrence

[57] ABSTRACT

A low-friction pulley member formed of high-density polyethylene having a molecular weight of between two and five million is mounted for rotation on a stainless steel supporting shaft including a head flange received in a cylindrical recess in one face of the pulley member and a retainer groove for a snap-ring retainer to provide a durable, low-friction and corrosion resistant pulley unit.

3 Claims, 5 Drawing Figures

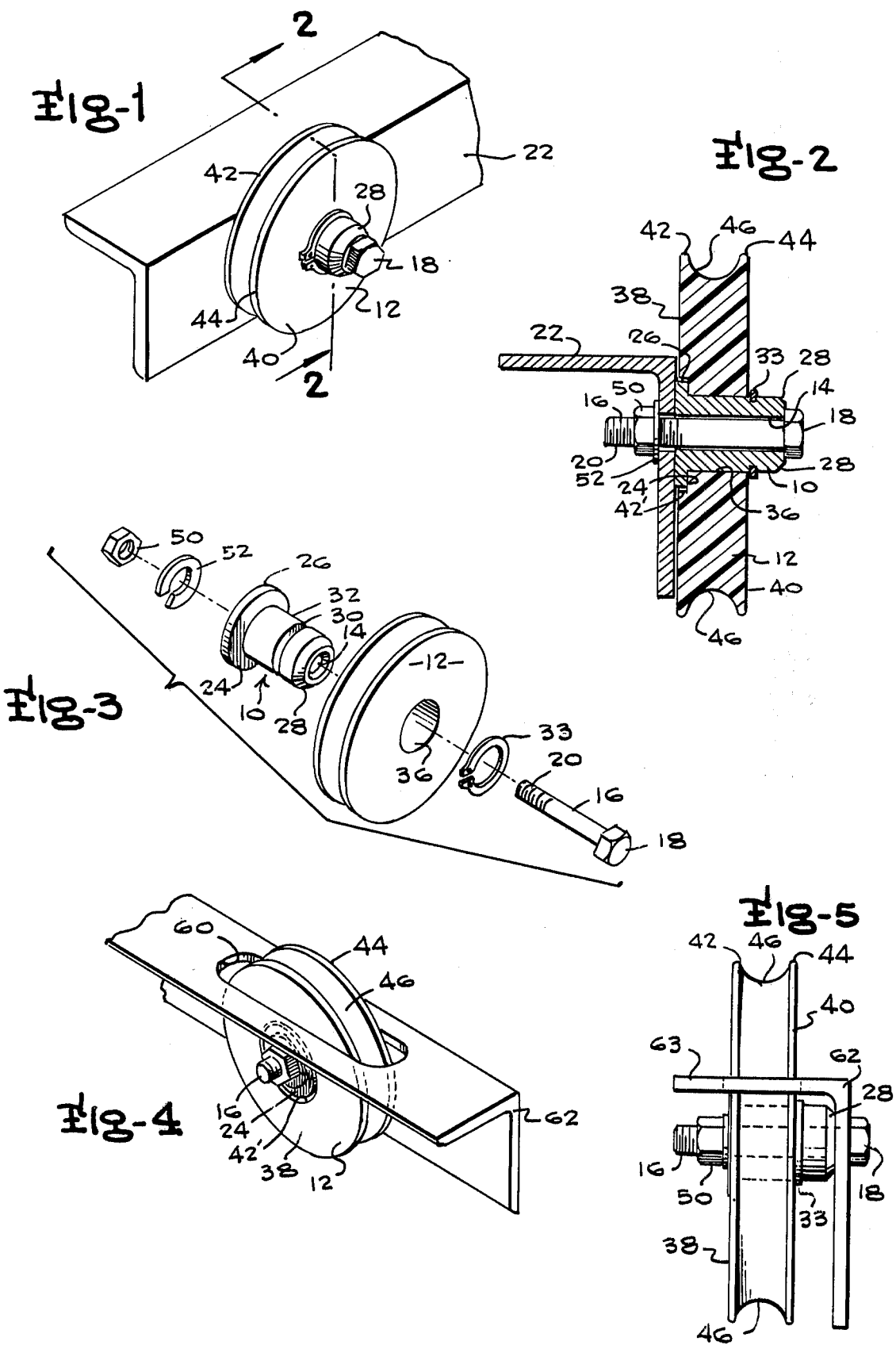

PULLEY MEANS

This invention is in the field of rotary support members and is more specifically directed to the field of low-friction pulleys and associated support devices.

There are a large number of prior known pulley devices which are formed of many different materials and which employ a wide range of structural features. For example, probably the most well-known pulley construction simply consists of rotary pulley wheel member having a cylindrical axial opening received over a supporting shaft or the like for rotation. Such devices have been made from metal, wood and other materials and have proven to be quite satisfactory when used in non-corrosive environments and when their use is neither continuous nor high-speed. However, since pulleys of the foregoing type have a substantial amount of frictional resistance to rotation, they cannot be operated at high speed due to overheating and are not satisfactory for usage in devices in which the resistance to rotation must be kept to a minimum.

One type of conventional pulley construction employs fabricated steel sheet material which is fabricated into a cylindrical pulley member including steel roller bearings resulting in a multi-piece construction. Pulleys of the foregoing type need frequent lubrication and are subject to corrosion and freeze-up so that they consequently require substantial maintenance. Additionally, pulleys of the aforementioned type also create a substantial amount of noise when in operation so as to create substantial noise abatement problems.

Plastic injection type pulleys have also been previously used; however, these pulleys also create a great deal of noise due to their particular bearing construction which is usually of the metal sleeve or roller type. Moreover, overheating of pulleys of this type frequently results in thermal failure of the plastic material.

Other prior known pulleys for low-friction installations have achieved a low resistance to rotation by the employment of roller or ball bearings for mounting the pulley member on a supporting shaft. Pulleys for use in corrosive environments have employed plastic pulley members fixedly mounted on a metal sleeve fitted over a supporting shaft with the metal sleeve providing the wear resistance necessary for satisfactory operation which would not be available if the plastic portion itself were used for the bearing surface. Pulleys of this type have been frequently employed in conveyor systems in canneries or the like for supporting movable cable members used for conveying cans or other containers through filling and other operations in which the pulley members are subjected to spillage from the containers being conveyed by the cable members. Frequently, the metal bearing surfaces have become corroded and clogged so as to substantially increase the friction or rotation of such pulley members so that frequent replacement is consequently necessary. Another drawback of the composite plastic and metal pulley members is that they are relatively expensive to fabricate.

Therefore, it is the primary object of this invention to provide a new and improved pulley construction.

A more specific object of the subject invention is the provision of a new and improved pulley construction that is economical to fabricate, is low-friction in operation and trouble-free when used in corrosive environments.

Achievement of the foregoing objects is obtained by the subject invention by the provision of a stainless steel pulley support shaft on which a pulley formed solely of hard, high-strength, corrosion-resistant polyethylene is mounted for rotation. The pulley member includes an axial cylindrical bearing surface extending between first and second faces of the pulley with an enlarged recess of cylindrical shape extending inwardly from one of the pulley faces for receiving a head flange on the stainless steel supporting shaft. The outer periphery of the pulley member comprises a pair of flange members that are arcuately curved in cross-section and between which an arcuately curved inwardly extending cable-receiving trough is provided. The stainless steel support shaft includes an axial passageway extending along its entire length through which a mounting bolt can be positioned for attachment of the support shaft to a supporting angle iron, frame member or the like. Additionally, the stainless steel support shaft includes a circumferential radially inwardly extending groove into which a stainless steel snap ring is received for engaging one face of the pulley member for maintaining the pulley member in position for rotation on the stainless steel support shaft.

Advantages of the subject invention include the fact that the idler never requires lubrication and is not subject to corrosion or gauling so that the pulley member will never freeze on the supporting shaft. The device is remarkably quiet running and the pulley member itself is practically totally wear resistant when used in nylon coated cable of a conveyor system. Consequently, the subject invention provides a pulley construction which is of extremely long life in service while having practically no maintenance problems incident to its operation.

A better understanding of the subject invention will be achieved when the following detailed description is considered in conjunction with the appended drawings, in which:

FIG. 1 is a perspective view of the preferred embodiment of the invention;

FIG. 2 is a sectional view taken along lines 2—2 of FIG. 1;

FIG. 3 is an exploded perspective view of the preferred embodiment;

FIG. 4 is a perspective view of an alternate method of mounting the preferred embodiment; and FIG. 5 is an end elevation of the alternate mounting of FIG. 4.

Attention is initially invited to FIGS. 1, 2 and 3 which illustrate the components of the preferred embodiment including a stainless steel pulley support shaft generally designated 10 formed of grade type 300 stainless steel and on which a pulley member generally designated 12 is mounted for rotation. Stainless steel pulley support shaft 10 includes an axial passageway 14 through which a supporting bolt 16 extends. Bolt 16 includes a head 18 and a threaded portion 20 extending through an aperture in an angle member 22 of a supporting frame with the aperture in the angle member being of slightly greater diameter than the diameter of the threaded portion. In addition, stainless steel supporting shaft 10 also includes a head flange 24 having a cylindrical outer surface 26. The end of the stainless steel shaft 10 opposite the head flange 24 is chamfered at 28. Additionally, a retainer slot 30 extends inwardly from a polished smooth cylindrical bearing surface 32 of the stainless steel pulley support shaft 10 for receiving a stainless steel snap ring 33 for maintaining the pulley member 12 on the stainless steel shaft 10.

Pulley member 12 is formed of hard abrasion-resistant ultra-high molecular weight high-density polyethylene resin having a molecular weight range between two and five million which is sold under the trademark 1900 UHMW POLYMER by Hercules Corporation of Wilmington, Del. The pulley member has outstanding abrasion and impact resistance and has an extremely low coefficient of friction with the stainless steel pulley support shaft 10. Consequently, the combination of the pulley member and the stainless steel support shaft results in a corrosion resistant low-friction pulley and associated support of great durability. The pulley member will normally be turned on a lathe or the like for fabrication with the absence of any need for additional bearing structure such as the metal sleeves previously required with prior plastic pulleys providing a substantial savings in cost.

Alternatively, the pulley member can be formed of polyester elastomer sold under the trademark HYTREL by Dupont Corporation of Wilmington, Del.

In any event, the plastic pulley member 12 includes a smooth cylindrical axial bearing surface 36 received over the polished bearing surface 32 of the stainless steel support shaft 10. Additionally, the pulley member includes first and second end face surfaces 38 and 40 and a cylindrical recess 42: extending inwardly from the first face 38. Cylindrical recess 42: is dimensioned to matingly receive the head flange 24 of the stainless steel shaft 10.

The outer periphery of the pulley member comprises a first circumferential flange 42 and a second circumferential flange 44 both of which are of arcuate cross-section. An arcuately curved circumferential trough 46 extends between the flanges 42 and 44 for receiving a cable or the like to be supported by the pulley member.

It will be noted that the stainless steel support shaft 10 can be mounted on the side of an angle member 22 in the manner illustrated in FIGS. 1 and 2 by the use of a nut 50 and a lock washer 53 which are tightened into position to snugly hold the stainless steel shaft 10 in position as best illustrated in FIG. 2. Alternatively, an aperture 60 can be provided in an angle member 62 and the pulley member mounted on the inner face of the angle member as shown in FIGS. 4 and 5. In such case, the end of the stainless steel shaft opposite the flange end would engage the side of the angle member through which the supporting bolt extends with the chamfer 28 permitting the shaft 10 to be mounted closely adjacent the upper horizontal flange 63 of the angle member 62 as best illustrated in FIG. 5.

The foregoing construction is extremely rugged, simple to fabricate and economical to use due to its low power requirements and its long life arising from its corrosion resistant low-friction components. While numerous modifications of the subject invention will undoubtedly occur to those of skill in the art, it should be understood that the spirit and scope of the invention is to be limited solely by the appended claims.

I claim:

1. A low-friction, corrosion resistant pulley assembly comprising in combination, a stainless steel shaft means having a cylindrical outer bearing surface and a pulley member formed of a unitary body of polyethlene material having first and second parallel side faces, first and second parallel side flanges, an arcuate peripheral trough positioned between said first and second parallel side flanges, each of said side flanges having an arcuate outer surface as viewed in cross-section, a cylindrical pulley bearing surface matingly received over said cylindrical outer bearing surface of said stainless steel shaft for rotation thereon and additionally including a cylindrical recess formed in said pulley member concentric to the axis of said pulley and having a greater diameter than the diameter of said cylindrical pulley bearing surface extending inwardly from one of said side faces and a head flange on one end of said stainless steel shaft matingly received within said cylindrical recess in cooperation therewith.

2. The invention of claim 1 wherein said pulley member includes first and second parallel side flanges, an arcuate peripheral trough positioned between said first and second parallel side flanges, each of said side flanges having an arcuate outer surface as viewed in cross-section, said pulley member being formed of polyethylene and additionally including a cylindrical recess concentric to the axis of said pulley of a greater diameter than the diameter of said cylindrical pulley bearing surface extending inwardly from one of said said side faces a distance approximately equal the thickness of one of said flanges.

3. The invention of claim 1 additionally including an axial passageway extending the length of said stainless steel shaft and supporting bolt means extending through said axial passageway for supporting said stainless steel shaft and pulley member thereon.

* * * * *